(12) United States Patent
Johnson

(10) Patent No.: US 6,429,847 B1
(45) Date of Patent: Aug. 6, 2002

(54) TRANSLATABLE CURSOR ACTUATOR CONTROL FOR A PORTABLE COMPUTER

(75) Inventor: Dax J. Johnson, Sioux City, IA (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/429,598

(22) Filed: Oct. 28, 1999

(51) Int. Cl.⁷ .............................................. G09G 5/08
(52) U.S. Cl. ................... 345/157; 345/161; 345/905; 361/686
(58) Field of Search ................. 345/157, 161, 345/905

(56) References Cited

U.S. PATENT DOCUMENTS

| | | | |
|---|---|---|---|
| 4,862,151 A | 8/1989 | Grauz et al. ............... 340/706 |
| 5,285,428 A | 2/1994 | Rosow et al. ............... 368/107 |
| 5,339,213 A | 8/1994 | O'Callaghan ............... 361/683 |
| 5,428,367 A | 6/1995 | Mikan ......................... 345/157 |
| 5,469,194 A | 11/1995 | Clark et al. ................. 345/173 |
| D370,534 S | 6/1996 | Hunger et al. ............. D24/201 |
| D377,789 S | 2/1997 | Wang et al. ................ D14/114 |
| 5,666,138 A | * 9/1997 | Culver ........................ 345/161 |
| 5,681,220 A | 10/1997 | Bertram et al. .............. 463/37 |
| 6,035,214 A | * 3/2000 | Henderson .................. 455/556 |

* cited by examiner

Primary Examiner—Steven Saras
Assistant Examiner—William C. Spencer
(74) Attorney, Agent, or Firm—Laurence R. Letson; Mark S. Walker

(57) ABSTRACT

Mounting the cursor actuator control or mouse buttons on the keyboard portion of a portable computer in a manner to permit the translation of the cursor actuator control across the keyboard portion of the portable computer, thereby allows the positioning of the cursor actuator control for comfort and convenience of the operator. The ability to relocate the cursor actuator control further allows any operator of the portable computer to minimize inadvertent operation thereof by the accidental and unintentional contact of user's thumb with the cursor actuator controls.

16 Claims, 5 Drawing Sheets

TRANSLATABLE CURSOR ACTUATOR CONTROL FOR A PORTABLE COMPUTER

FIELD OF THE INVENTION

This invention relates to portable computers and, more specifically to the capability to relocate and reposition the cursor actuator control on the computer housing for more convenience, efficiency, and comfort. The cursor actuator control actuates a computer operation which then is depicted by the position of a cursor relative to an icon or symbol and displayed on the monitor or computer display.

BACKGROUND OF THE INVENTION

Mouse buttons, the common term for control pushbuttons, are used to control a computer through the identification of an icon by the cursor and the operation of the cursor actuator buttons. The control push-buttons are intended to be ergonomically located and typically are positioned either on the top surface or an edge surface of the keyboard section the portable computer. Within the wide audience of users, mouse buttons do not accommodate all people nor are convenient and comfortable for all.

Operating a portable computer with hands in a normal typing position to the keyboard almost inherently places the thumbs over or near the computer mouse buttons and may unintentionally activate one of the mouse buttons, causing the computer to initiate a computer operation that is not intended or desired. An inadvertent actuation of the computer operation may result in as little inconvenience as having to reverse the operation to return to the present task, or as much as a complete loss of all the work performed up to that point on a particular project. To avoid any inadvertent or unintentional occurrences by these computer-housing located mouse buttons, it is desirable to relocate them in a position relative to the keyboard that will prevent such accidental activation.

Laptop computers are becoming the communication device of choice for making presentations, particularly when the presentation is made to an individual. Laptop computers are also used in conjunction with overhead or other types of projectors to provide enlarged projections of graphics to larger groups. The graphic displays to be shown are electronically stored in memory, called up, and displayed in the desired sequence in response to a cursor being positioned over an icon or a command block displayed on the computer display, then the operator depresses a mouse button or cursor actuator control button. With fixed cursor actuator controls on the keyboard section of the computer, a presenter must reach from a side position to a position in front of the individual viewing the presentation in order to activate the cursor actuation control button to progress through the presentation. If making a one-on-one presentation, this presents a significant distraction to the viewer, not only offsetting a portion of the benefit of using the portable computer but also it is awkward and uncomfortable.

Further, to provide one-on-one training on the usage of laptop computers or software loaded thereon, the reach to the cursor actuator control buttons is difficult and awkward for the presenter.

Although most portable computers can accommodate a separate mouse, any extra device creates inconvenience in carrying and storage as well as distractions during setup.

OBJECTS OF THE INVENTION

It is an object of the invention to provide the operator of a portable computer the ability to position cursor actuator controls or mouse buttons in positions to avoid any inadvertent actuation of these controls.

It is another object of the invention to provide in a portable computer the ability to position the cursor actuation controls so that the cursor actuation controls are comfortably operable by a person positioned to one side of the computer.

It is a further object of the invention to provide in a portable computer the ability to position the cursor actuation controls wherein the position of the controls may be optimized for the person who predominately uses the computer while allowing adjustments for other operators.

It is an additional object to provide a cursor actuator control in a portable computer which may be laterally displaced relative to the keyboard section of the computer.

SUMMARY OF THE INVENTION

The cursor actuator control in the form of a pair of push-button controlled switches may be movably positioned within the region between the keyboard of a portable or laptop computer and the operator. The cursor actuator control may be pivotally displaced, slidably displaced, or both; displacement allows an operator to move the cursor actuator control out of a position subject to inadvertent actuation or to a more ergonomic or comfortable position.

The cursor position control itself may take the form of a conventional wobble post in the keyboard or a touch pad positioned within the arcuate path of movement of the cursor actuator control buttons. Both the wobble post and touch pad cursor position controls are conventional and used on various portable or laptop computers. Touch pads, as previously implemented, are fixed in location and/or orientation.

Figure 1:
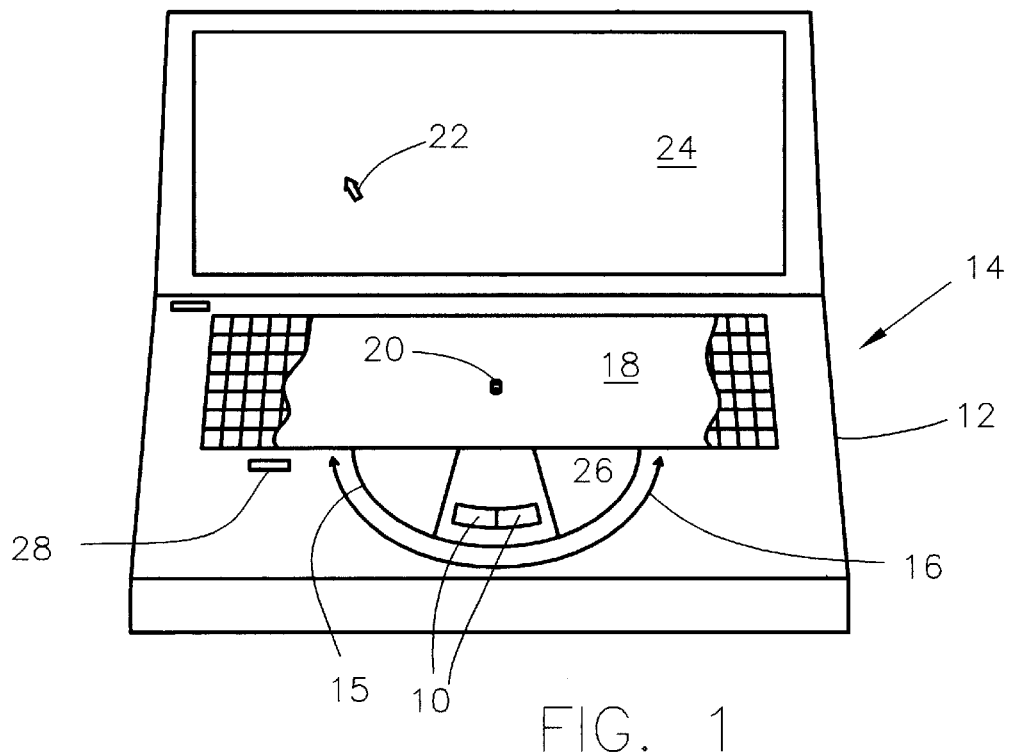
FIG. 1 is an illustration of a portable computer having a cursor actuator control which is displaceable relative to the keyboard portion of the computer housing.

DETAILED DESCRIPTION OF THE PREFERRED EMBODIMENT
OF THE BEST MODE OF THE INVENTION
AS CONTEMPLATED BY THE INVENTOR

In this detailed description, the term "mouse controls" relates to and is used to identify and describe either a pair of depressible buttons or switches which are the equivalent of the finger controlled push-to-make switches found on a traditional desktop mouse or those depressible buttons and associated switches that perform equivalent functions on the face or edge of a keyboard portion of a portable or laptop computer. These buttons and switches cooperate with the computer and are combined with a computer recognized position by an arrow or other cursor icon on the display of the computer relative to the displayed graphics. The operation of the cursor actuator control or mouse controls create a cursor actuation control command which initiates the operation of the computer to perform the function as represented by the portion of the display graphics over which the cursor is positioned at the time a button is depressed and the corresponding switch is actuated.

Like reference numerals are used in the various figures to designate like elements and may appear in a plurality of the figures without a specific description of the element with regard to each figure. In instances wherein there is no description of an elements in regard to a figure but the element is described with regard to another figure, the description relates to all figures in which the numbered element appears.

Should the mouse buttons or cursor actuator controls 10 be located in a position uncomfortable and/or inconvenient for the operator, mouse buttons 10 may be moved relative to the keyboard section or portion 12 of portable computer 14 as illustrated in the various drawings. This description refers to FIG. 1, initially, which shows a laptop or portable computer 14 with the mouse button 10 displaceable in an arc 16 as indicated here by arrow 16, disposed intermediate the normal operator position and keyboard 18 itself and positioned within the keyboard portion 12 of computer 14.

The exterior of the keyboard section 12 of the computer 14 forms a circular guide 15 within which the mouse buttons 10 are movable. The internal mouse control switches (not shown) may be electrically connected by flexible circuit cables or other conductors (not shown).

Cursor actuator control 10 and cursor position control 20 together constitute a "mouse" or mouse control assembly 26, common usage terms for a device for controlling a cursor position and activating a command indicated graphically by the cursor 22.

The cursor position control 20 is typically a movable or wobble post or joy stick 20 disposed between individual keys of the keyboard 18 and, in fact, is found in a multitude of laptop computers. Movement by the user's index finger of post 20 is converted to signals which, in turn, control any movement and/or positioning of cursor 22 across the face of the display 24. The cursor position control 20 operates to generate signals representing direction and velocity to move the cursor 22 about the face of the display 24 of the computer 14, and ultimately electronically indicating a particular location or symbol on display 24. The position of cursor 22, typically an arrow symbol 22, together with an electrical signal generated by the cursor actuator controls or mouse buttons 10 input a command to the computer 14 as is conventional and well understood by those of skill in the art of computer and mouse design. The combined signals are utilized by the microprocessor to initiate a command for a computer operation if a computer operation is indicated.

The cursor position control 20 and the cursor actuator controls 10 are connected to the computer electronics in the same manner as and function as the prior art counterparts and may be constructed and connected to control the computer 14 by one who is of ordinary skill in the art of computer design.

With hands in normal keyboarding positions, thumbs are thus over the cursor actuator control buttons 10. This positioning can create problems for those who tend to rest their hands and particularly the heel of their hands on the computer; they may inadvertently actuate a cursor designated command.

Figure 2:
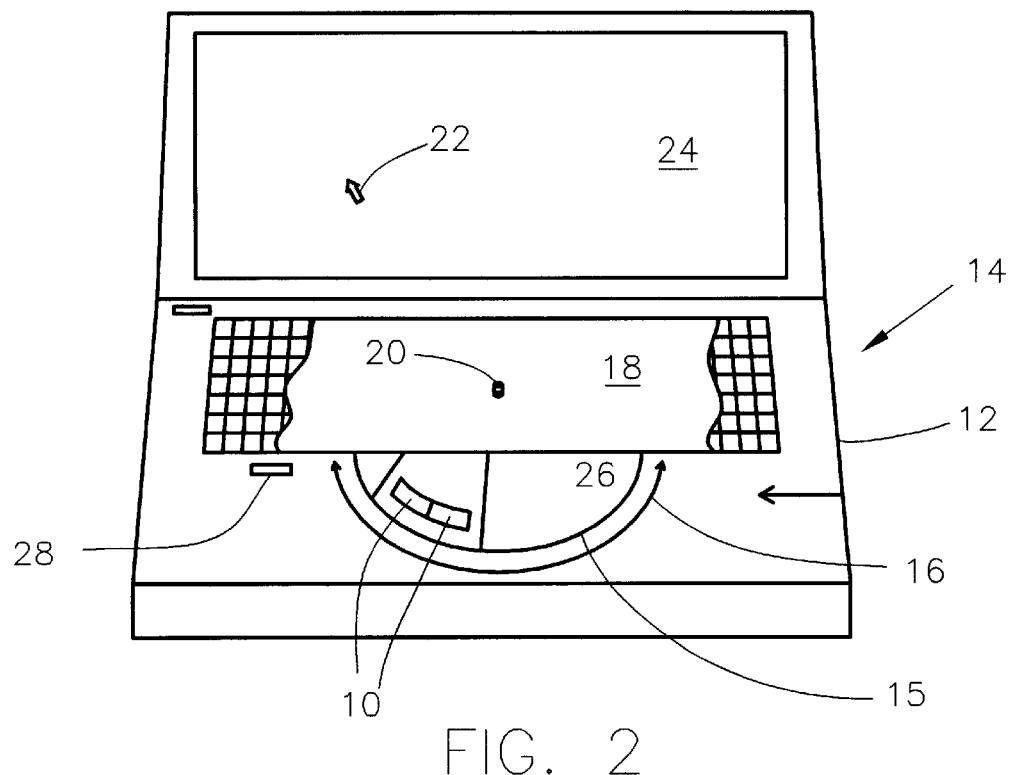
FIG. 2 is an illustration of the portable computer of FIG. 1 with the cursor actuator control dislocated to the left.

Swivelling the entire cursor actuator control assembly 26 to the left, as in FIG. 2, or to the right repositions the cursor actuator control 10 to a more protected position from one where inadvertent actuation is likely. Mouse buttons 10 may be similarly displaced to the right, if desired by the operator.

The position of the cursor actuator control 10 is maintained by a locking device, such as a push-to-release mechanism controlled by release button 28. The locking device need only be as simple as a friction pad spring-biased against a portion of the cursor actuator control assembly 26.

As laptop computers have gained in capability and popularity, many are now used for making graphic presentations instead of using graphic charts or a projector and slides of transparencies. In most instances, such as this, the presentation graphics are controlled by the actuation of a cursor actuator control to page through the previously prepared graphics of the presentation. Currently, in order to avoid the problems associated with the position of the cursor actuator control, a conventional mouse must be connected to the portable computer.

With the present cursor actuator control swivelled to one side, the presenter may more easily and comfortably use the cursor actuator controls 1 0 while positioning an observer directly in front of the somewhat narrow viewing field of the screen of display 24. Liquid crystal displays are the most common type displays 24 used on portable and laptop computers. Thus, the intended viewer must be positioned within the narrow angle of view of the display.

Figure 3:
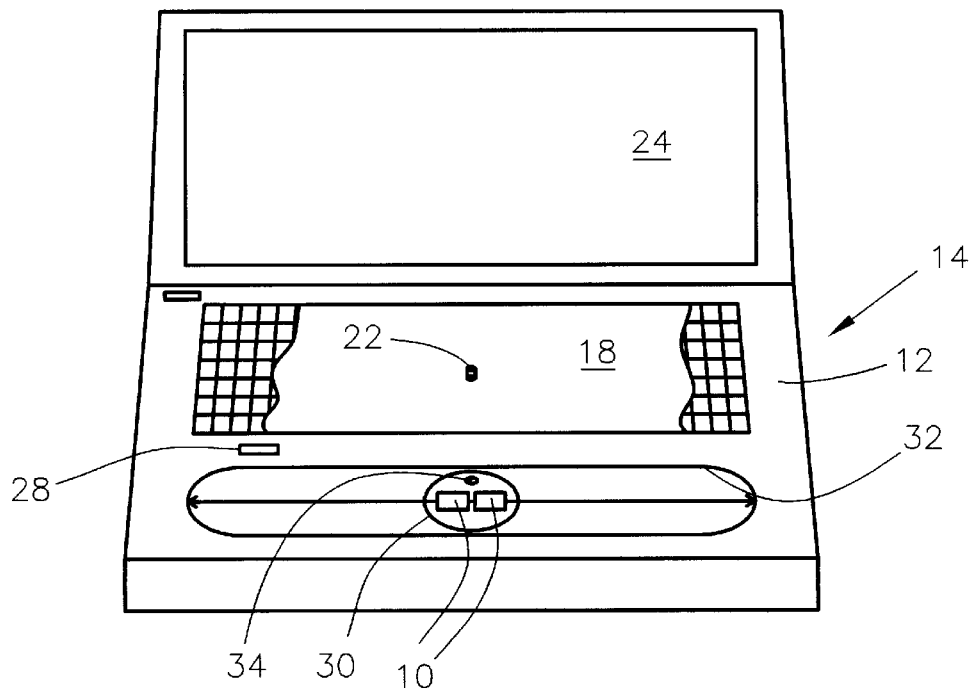
FIG. 3 is an illustration of a portable computer having a cursor actuator control which is translatable laterally across the keyboard portion of the computer housing.
Figure 4:
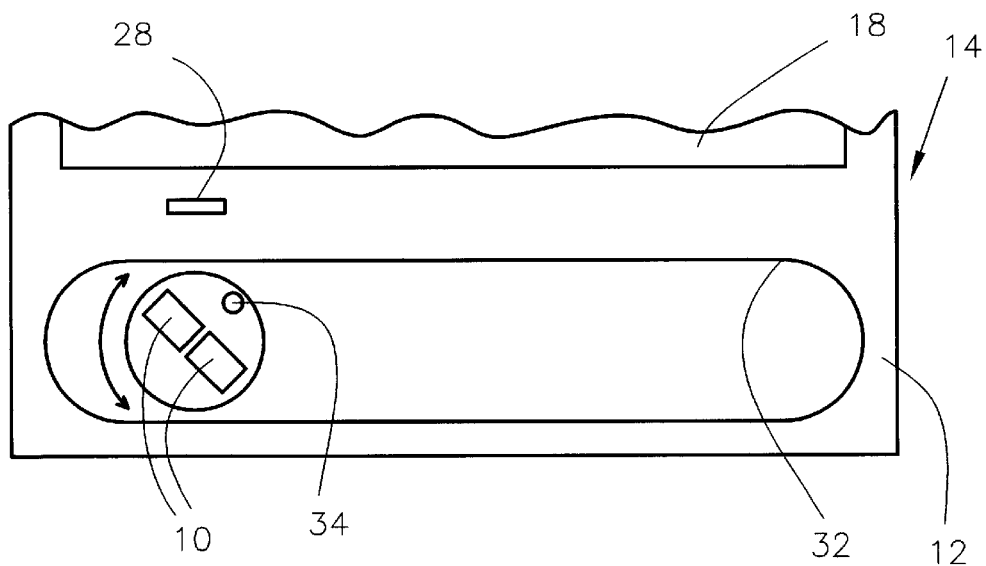
FIG. 4 is an illustration of a segment of the keyboard portion of the portable computer of FIG. 3 wherein the cursor actuator control unit is both translatable as well as rotatable relative to the keyboard of the computer.

FIGS. 3 and 4 illustrate a computer 14 or a portion of a computer 14 having a cursor actuator control 30 formed in a rotatable unit 30 that is additionally translatable laterally across the keyboard portion 12 of the computer 14. FIG. 4 illustrates only the movable cursor actuator control unit 30 and its retaining and guiding track 32. The rotatable control unit 30 is guided and retained by track 32 formed in and by the case of computer 14.

Rotatable control unit 30 carries the mouse buttons 10 or cursor actuator controls 10 which are electrically connected to the computer processor (40 in FIG. 9) in a conventional manner. The electrical connection between the cursor actuator controls 30 may be made of flexible circuit cables and either discrete wires or commutators. Rotatable unit 30 is provided with a depression 34 in the surface which permits insertion of a finger tip to translate or rotate the rotatable unit 30 relative to the computer 14.

Figure 5:
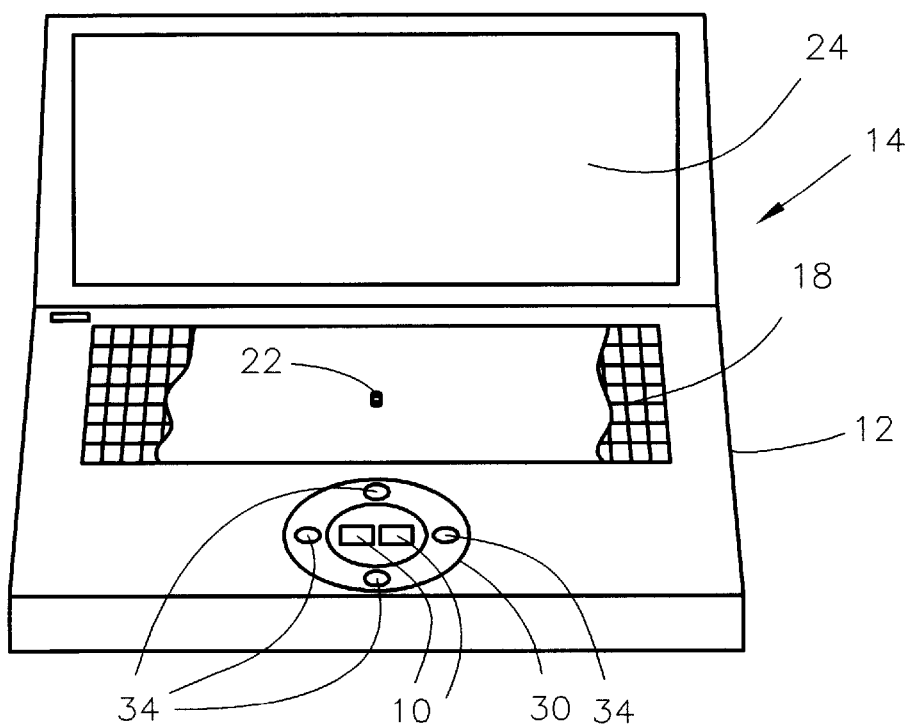
FIG. 5 is an illustration of a portable computer having a cursor actuator control surrounded by a rotatable control ring with a plurality of finger indentations in the control ring to aid in the rotation of the cursor actuator control.
Figure 6:
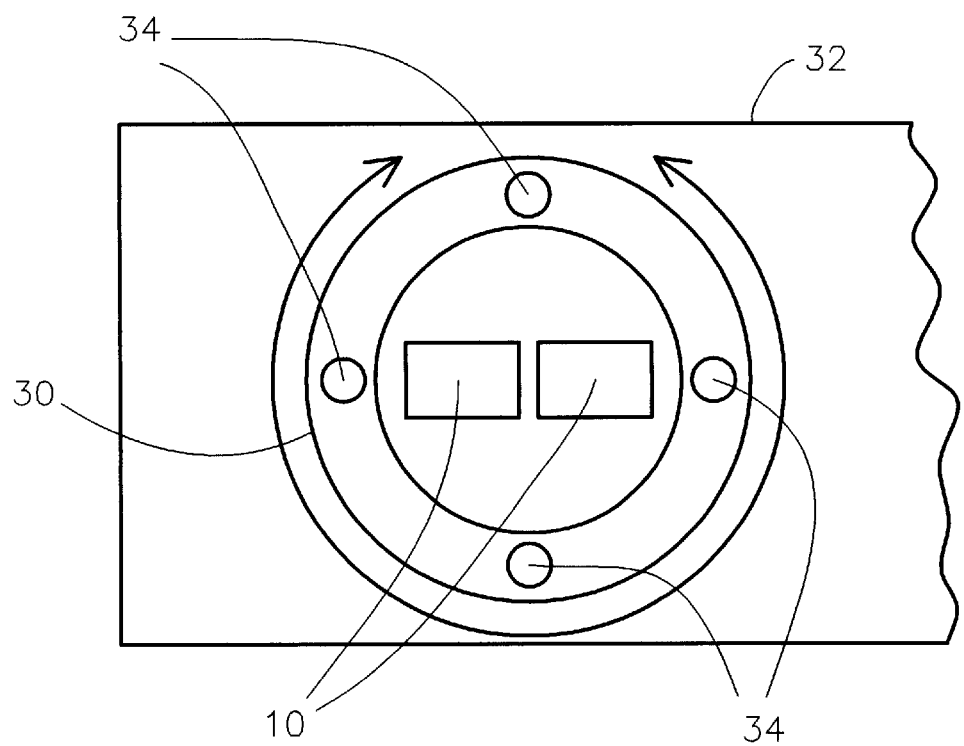
FIG. 6 is an enlarged illustration of the cursor actuator control shown in FIG. 5.

FIGS. 5 and 6 illustrate a control similar to that shown in FIGS. 3 and 4 except that the rotatable unit 30 provides a plurality of finger indentations or depressions 34 and the rotatable unit 30 is a complete ring. capable of full rotation.

Figure 7:
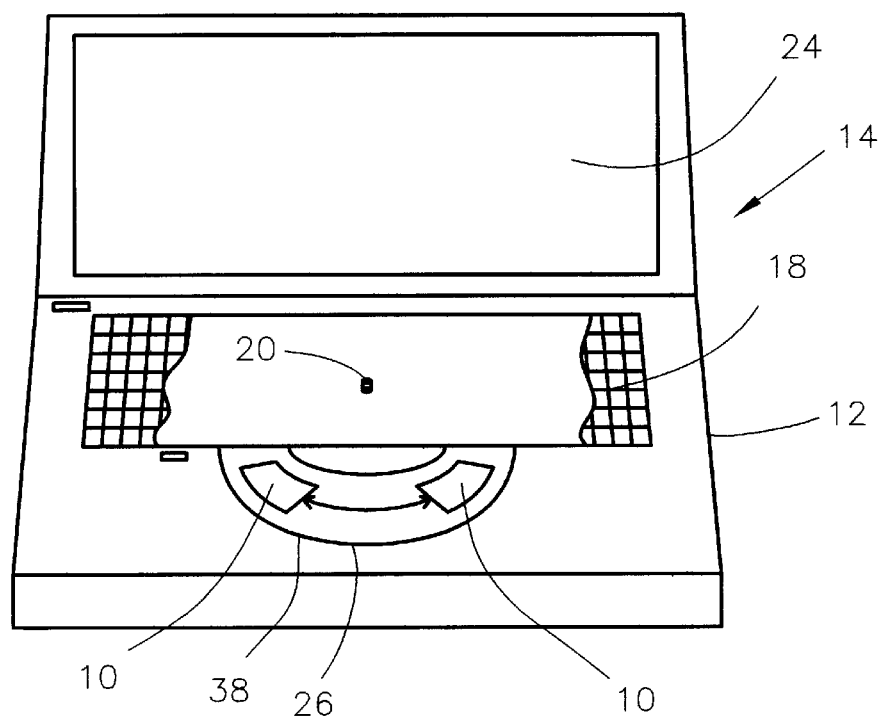
FIG. 7 is an illustration of a portable computer with a cursor actuator control wherein the control buttons are independently movable to alternate positions.

FIG. 7 illustrates the mouse control 38 where the cursor actuator control buttons 10 are independently mounted and may be moved in opposite directions either to dispose the buttons 10 out of the way of an user's hands and thumbs or to accommodate the positional desires of the operator. Cursor positional control 20 is similarly disposed in the midst of keyboard 18.

Figure 8:
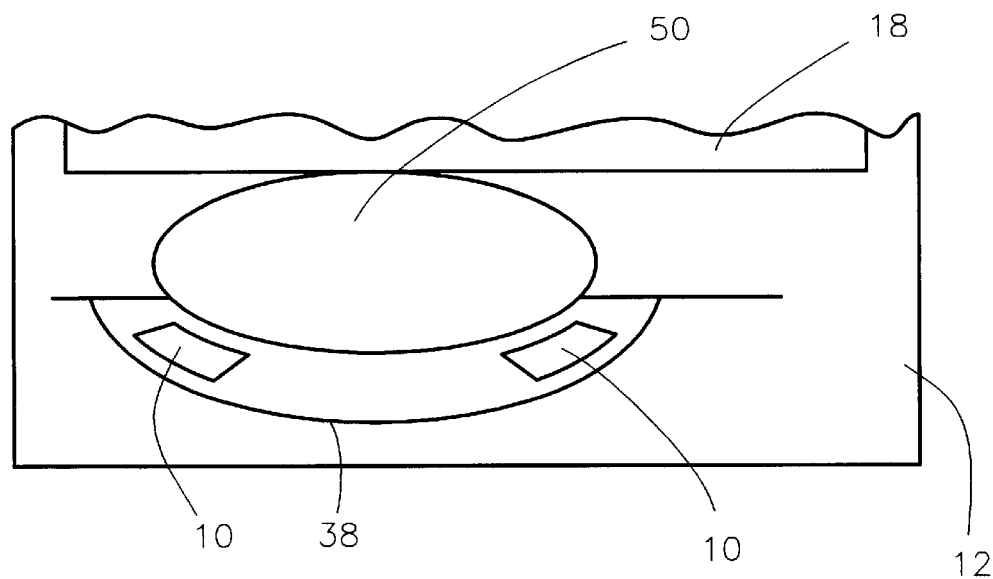
FIG. 8 is an enlarged illustration of a cursor actuator control of the type shown in FIG. 7 with a touch pad cursor positional control disposed within the arcuate paths through which the cursor actuator controls may be moved.

An alternative to the cursor positional control 20 is a touch pad 50 illustrated in FIG. 8. The touch pad 50 may be formed in an ellipse, oval, circle or other convenient shape. Touch pad 50 is conventional in construction and is conventionally connected to the computer processor (40 in FIG. 9). The touch pad 50 may be fixed in a single lateral location or may be translatable on a rotatable member such as illustrated in FIGS. 3 and 4. The touch pad 50 may be rotatable to one side or the other so that the X-Y axis of the touch pad 50 may be oriented as desired by the operator with the same angular relation as the cursor actuator control 30 in FIG. 3; or, if of an elongated shape, touch pad 50 may remain fixed relative to the keyboard portion 12 of computer 14. Even if touch pad is fixed and remains oriented at an angle to the user, the human brain can compensate and the user still may control the cursor accurately and efficiency.

Figure 9:
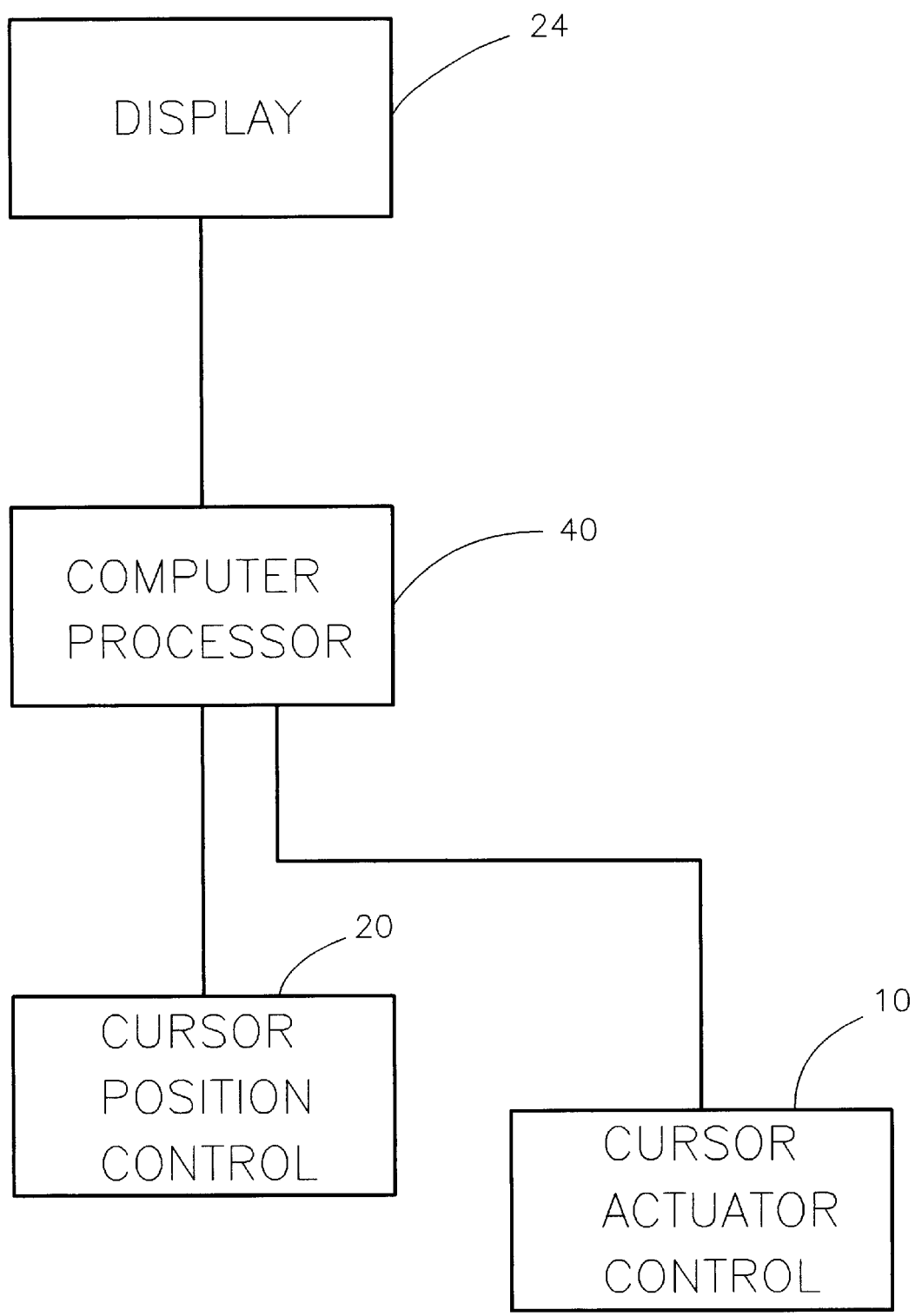
FIG. 9 is a block diagram illustrating the connections between the cursor positional control, the cursor actuator control, the display, and the computer processor.

Refer now to FIG. 9, a portion of the portable computer is illustrated in diagrammatic form. Computer processor 40 connects directly to all the other components illustrated 10,20, 24. Computer processor 40 provides the signals to display 24 not only to produce and display the material, including icons and control blocks, but also to produce, display, and move a cursor on display 24.

Control of the cursor (not shown) is provided by the cursor position control 20 and cursor actuator control 10. The cursor position control 20 generates signals representative of the direction and velocity with which the cursor is to move; and, the cursor actuator control 10 generates signals which command the computer processor 40 to perform an operation, the identification of the operation being the icon or control block displayed on the display 24 and having a cursor symbol positioned thereon.

The software incorporated into the computer processor for accepting the signals from the cursor position control 30 and the cursor actuation control 10 and for initiating the indicated computer function is conventional and well known to those of skill in the art of computer design.

It will be understood by one of skill in the art of computer design that in light of the above detailed description of the invention, translatable and rotatable cursor actuator and/or rotatable touch pad may be implemented such that it is positioned on top of the keyboard portion of the computer or may be incorporated into the keyboard portion, as shown. One of skill in the art will also understand that other changes and variations in the design of the computer may result in minor changes and variations in the cursor actuation control device and its positioning and relationship relative to the computer without removing the modified device from the scope of the attached claims which define the invention.

I claim:

1. A portable computer, comprising:

a keyboard;

a display;

a frame, having a first position for supporting said keyboard, and a second portion for supporting said display relative to each other;

a cursor position control;

a cursor function actuator control for actuating functions of said computer when indicated by operation of said cursor position control to position a cursor over an indicator of a selected computer function;

said keyboard and said cursor function actuator control disposed on said first portion of said frame;

said cursor function actuator control displaceable in a plane substantially coextensive with a surface of said portion of said frame having said keyboard thereon, and said cursor function actuator control positional by the user in one of a plurality of positions relative to said keyboard;

wherein said cursor function actuator is translatable laterally relative to said keyboard and said first portion of said frame, wherein said cursor control function actuator is repositionable in said selected position by a relatable latch engagable with said cursor function actuator and supported within said first portion or said frame, wherein said cursor control comprises a displaceable control disposed intermediate keys on said keyboard.

2. The computer of claim 1 wherein said cursor function actuator is repositionable in said selected position by relatable frictional resistance between said cursor function actuator control and a positional lock supported within said first portion of said frame.

3. The computer of claim 1 wherein said relatable latch is manually accessible and operable on said first portion of said frame.

4. The computer of claim 1 wherein said cursor function actuator is movable in an arcuate path, said arcuate path disposed intermediate said keyboard and an operator position proximate said keyboard.

5. The computer of claim 4 wherein said cursor function actuator is repositionable in said selected position by a relatable retainer.

6. The computer of claim 5 wherein said cursor control comprises a displaceable control disposed intermediate keys on said keyboard.

7. The computer of claim 1 wherein said cursor function actuator is further movable in an arcuate path, said arcuate path disposed intermediate said keyboard and an operator position proximate said keyboard.

8. The computer of claim 7 wherein said cursor function actuator is repositionable in said selected position by relatable frictional resistance between said cursor function actuator and a positional lock supported within said first portion of said frame.

9. The computer of claim 1 wherein said cursor function actuator is rotateable relative to said first portion of said frame.

10. A portable computer comprising:

a keyboard;

a display;

a frame, having a first and a second portion, said first portion for supporting said keyboard and said second portion for supporting said display relative to each other;

a cursor position control, said cursor position control disposed on said first portion of said frame;

a cursor actuator control, said cursor control translatable relative to said first portion of said frame, and whereby said cursor actuator control may be positioned by an operator in a position of convenience and comfort relative to said keyboard, wherein said cursor actuator control is translatable in an arcuate path.

11. The portable computer of claim 10 wherein said cursor actuator control is translatable relative to said keyboard.

12. The portable computer of claim 10 wherein said cursor actuator control comprises a plurality of manually actuatable buttons, said buttons translatable independently of the other.

13. The portable computer of claim 10 wherein said computer further comprises said cursor positional control disposed within the bounds of said keyboard.

14. The portable computer of claim 10 wherein said cursor position control is disposed within said arcuate path and translatable with said cursor actuator control.

15. The portable computer of claim 14 wherein said cursor position control comprises a touch pad.

16. The portable computer of claim 10 wherein said cursor function actuator is rotateable relative to said first portion of said frame.

* * * * *